(12) United States Patent
Furutake

(10) Patent No.: US 11,044,459 B2
(45) Date of Patent: Jun. 22, 2021

(54) LENS MODULE AND STEREO CAMERA

(71) Applicant: DENSO CORPORATION, Kariya (JP)

(72) Inventor: Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/984,877

(22) Filed: May 21, 2018

(65) Prior Publication Data

US 2018/0343439 A1    Nov. 29, 2018

(30) Foreign Application Priority Data

May 23, 2017  (JP) .............................. JP2017-101796

(51) Int. Cl.
  *H04N 13/239*   (2018.01)
  *B60R 11/04*    (2006.01)
  *H04N 5/225*    (2006.01)

(52) U.S. Cl.
  CPC ........... *H04N 13/239* (2018.05); *B60R 11/04* (2013.01); *H04N 5/2254* (2013.01); *H04N 5/2258* (2013.01); *B60R 2300/107* (2013.01); *H04N 2213/001* (2013.01)

(58) Field of Classification Search
  CPC . G02B 7/102; G02B 7/08; G02B 7/10; G02B 7/021; G02B 7/023; G02B 27/646; G02B 7/026; G02B 7/022; G02B 7/02; H04N 5/2254; H04N 5/2253; H04N 5/2257; H04N 5/2252; G03B 17/04
  See application file for complete search history.

(56) References Cited

U.S. PATENT DOCUMENTS

| 2006/0158748 | A1  | 7/2006  | Hirata et al. |
| 2006/0221469 | A1* | 10/2006 | Ye ........................... G02B 7/021 359/811 |
| 2015/0103407 | A1* | 4/2015  | Chen ........................ G02B 1/11 359/601 |
| 2016/0191899 | A1* | 6/2016  | Ohsumi ............... G03B 11/045 348/46 |

FOREIGN PATENT DOCUMENTS

| JP | 2006-201378 A | 8/2006  |
| JP | 2008-197584 A | 8/2008  |
| JP | 2009-258560 A | 11/2009 |
| JP | 2011-018081 A | 1/2011  |
| JP | 2013-127598 A | 6/2013  |
| JP | 2015-025974 A | 2/2015  |

* cited by examiner

*Primary Examiner* — Farhan Mahmud
(74) *Attorney, Agent, or Firm* — Maschoff Brennan

(57) ABSTRACT

In a lens module, a tubular body includes first and second openings at respective first and second ends thereof. Lenses are disposed in the tubular body such that the lenses have a common optical axis. An elastically tubular eccentricity restriction member is coaxially disposed in the tubular body such that the outer periphery of the eccentricity restriction member is in contact with the inner periphery of the tubular body, and the inner periphery of the eccentricity restriction member surrounds the outer periphery of at least one of the lenses while inwardly biasing the outer periphery of the at least one of the lenses. The eccentricity restriction member includes a holder formed at the first end thereof. The holder is attached to one of the lenses that is closest to the first end of the eccentricity restriction member.

16 Claims, 5 Drawing Sheets

LENS MODULE AND STEREO CAMERA

CROSS REFERENCE TO RELATED APPLICATION

This application is based on and claims the benefit of priority from Japanese Patent Application No. 2017-101796 filed on May 23, 2017, the disclosure of which is incorporated in its entirety herein by reference.

TECHNICAL FIELD

The present disclosure relates to lens modules each comprised of a plurality of lenses, and stereo cameras each including such a lens module.

BACKGROUND

Japanese Patent Application Publication No. 2013-127598, which will be referred to as a published patent document, discloses a stereo camera attached to the front windshield of a vehicle. The stereo camera disclosed in the published patent document includes first and second imagers, and each of the first and second imagers is configured to capture, via a lens of a lens module, images of a predetermined image region defined in front of the vehicle.

SUMMARY

Such a stereo camera attached to the windshield of a vehicle is subjected to direct sunlight in the interior of the vehicle. This may increase the temperature of the stereo camera up to at least 100° C. This may cause components constituting the stereo camera to thermally expand, resulting in the lens of the at least one of the first and second imagers of the stereo camera moving from its designed position in the direction perpendicular to the optical axis of the lens.

In view of the circumstances set forth above, a first aspect of the present disclosure seeks to provide lens modules, each of which is configured to restrict movement of at least one lens of a lens module in a direction perpendicular to an optical axis of the lens module.

Additionally, a second aspect of the present disclosure seeks to provide stereo cameras each comprised of such a lens module according to the first aspect of the present disclosure.

According to a first exemplary aspect of the present disclosure, there is provided a lens module. The lens module includes a tubular body having opposing first and second ends in an axial direction thereof, and an inner periphery. The tubular body includes first and second openings at the respective first and second ends. Each of the first and second openings communicates with an interior of the tubular body. The first opening is configured to enable light to be incident into the tubular body therethrough. The lens module includes a plurality of lenses disposed in the tubular body such that the lenses have a common optical axis, and an eccentricity restriction member made of an elastic tubular member.

The eccentricity restriction member has opposing first and second ends in an axial direction thereof, and an inner periphery and an outer periphery. The first end of the eccentricity restriction member is closer to the first end of the tubular body than the second end of the eccentricity restriction member is. The eccentricity restriction member is coaxially disposed in the tubular body such that 1. The outer periphery of the eccentricity restriction member is in contact with the inner periphery of the tubular body
2. The inner periphery of the eccentricity restriction member surrounds an outer periphery of at least one of the lenses while inwardly biasing the outer periphery of the at least one of the lenses. The eccentricity restriction member includes a holder formed at the first end thereof. The holder is attached to one of the lenses that is closest to the first end of the eccentricity restriction member.

The eccentricity restriction member of the lens module according to the first exemplary aspect is coaxially disposed in the tubular body such that the inner periphery of the eccentricity reduction member surrounds the outer periphery of at least one of the lenses while inwardly biasing the outer periphery of the at least one of the lenses.

This configuration prevents each of the lenses from being thermally expanded. This configuration also enables, even if at least one of the lenses or the tubular body is thermally expanded, the eccentricity reduction member elastically presses the outer periphery of the at least one of the lenses inward, making it possible to restrict movement of the at least one of the lenses in a radial direction perpendicular to the optical axis.

According to a second exemplary aspect of the present disclosure, there is provided a stereo camera. The stereo camera includes a housing having an inner hollow container space and a predetermined linear expansion coefficient, a first lens module at least partly housed in the housing, and a second lens module at least partly housed in the housing.

Each of the first and second lens modules includes a tubular body. The tubular body has opposing first and second ends in an axial direction thereof, an inner periphery, and a predetermined linear expansion coefficient that is identical to the linear expansion coefficient of the housing. The tubular body includes first and second openings at the respective first and second ends. Each of the first and second openings communicates with an interior of the tubular body. The first opening is configured to enable light to be incident into the tubular body therethrough.

Each of the first and second lens modules includes a plurality of lenses disposed in the tubular body such that the lenses have a common optical axis, and an eccentricity restriction member made of an elastic tubular member. The eccentricity restriction member has opposing first and second ends in an axial direction thereof, and an inner periphery and an outer periphery. The first end of the eccentricity restriction member is closer to the first end of the tubular body than the second end of the eccentricity restriction member is. The eccentricity restriction member is coaxially disposed in the tubular body such that 1. The outer periphery of the eccentricity restriction member is in contact with the inner periphery of the tubular body
2. The inner periphery of the eccentricity restriction member surrounds an outer periphery of at least one of the lenses while inwardly biasing the outer periphery of the at least one of the lenses The eccentricity restriction member includes a holder formed at the first end, the holder being attached to one of the lenses that is closest to the first end of the eccentricity restriction member.

Because the stereo camera includes each of the first and second lens modules whose configuration is identical to the lens module according to the first exemplary aspect, the stereo camera obtains the benefit that is the same as the benefit obtained by the lens module according to the first exemplary aspect.

Additionally, the stereo camera is configured such that the linear expansion coefficient of the tubular body is set to be identical to the linear expansion coefficient of the housing. This configuration therefore prevents the optical axis of each of the first and second lens modules from being deviated from its original axis due to the difference in liner expansion coefficient between the tubular body and the housing.

According to a third exemplary aspect of the present disclosure, there is provided a lens module. The lens module includes a tubular body having opposing first and second ends in an axial direction thereof, and an inner periphery. The tubular body includes first and second openings at the respective first and second ends. Each of the first and second openings communicates with an interior of the tubular body. The first opening is configured to enable light to be incident into the tubular body therethrough.

The lens module includes a plurality of lenses disposed in the tubular body such that the lenses have a common optical axis, and a plurality of eccentricity restriction members each made of an elastic tubular member.

Each of the plurality of eccentricity restriction members has opposing first and second ends in an axial direction thereof, and an inner periphery and an outer periphery. Each of the eccentricity restriction members is coaxially arranged in the tubular body such that 1. The outer periphery of the eccentricity restriction member is in contact with the inner periphery of the tubular body
2. The inner periphery of the eccentricity restriction member surrounds an outer periphery of a corresponding one of the lenses while inwardly biasing the outer periphery of the corresponding one of the lenses Each of the eccentricity restriction members includes a holder formed at the first end thereof. The holder of each of the eccentricity restriction members is attached to a corresponding one of the lenses.

The lens module includes a securing member attached to the second end of the tubular body and configured to press one of the lenses toward the first end of the tubular body to thereby secure the lenses and the eccentricity restriction members to the tubular body. One of the lenses pressed by the securing member is closest to the second end of the tubular body.

The lens module according to the third exemplary aspect is configured such that each of the eccentricity restriction members is disposed between the inner periphery of the tubular body and the corresponding one of the lenses to surround the outer periphery of the corresponding one of the lenses while inwardly biasing the outer periphery of the corresponding one of the lenses.

This configuration prevents each of the lenses from being thermally expanded, and also enables, even if at least one of the lenses or the tubular body is thermally expanded, the corresponding at least one of the eccentricity restriction members to elastically press the outer periphery of at least one of the lenses inward, making it possible to restrict movement of the at least one of the lenses in a radial direction perpendicular to the optical axis.

The lens module according to the third exemplary aspect is configured such that each of the holders formed at the first end thereof is closely attached to the corresponding one of the lenses. This results in the friction between each of the holders and the corresponding one of the lenses restricting radial movement of the lenses, which is perpendicular to the optical axis.

The lens module according to the third exemplary aspect includes the securing member attached to the second end of the tubular body. The securing member is configured to press one of the lenses toward the first end of the tubular body. One of the lenses pressed by the securing member is closest to the second end of the tubular body. This enables each of the holders to be more closely attached to the corresponding one of the lenses. This results in an increase of the friction between each of the holders and the corresponding one of the lenses, thus further restricting radial movement of the lenses, which is perpendicular to the optical axis.

Note that, in the specification, the expression that A is identical or equal to B includes the first case where A is strictly identical to B and the second case where A is substantially identical to B as long as the second case is within the scope of the present disclosure.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
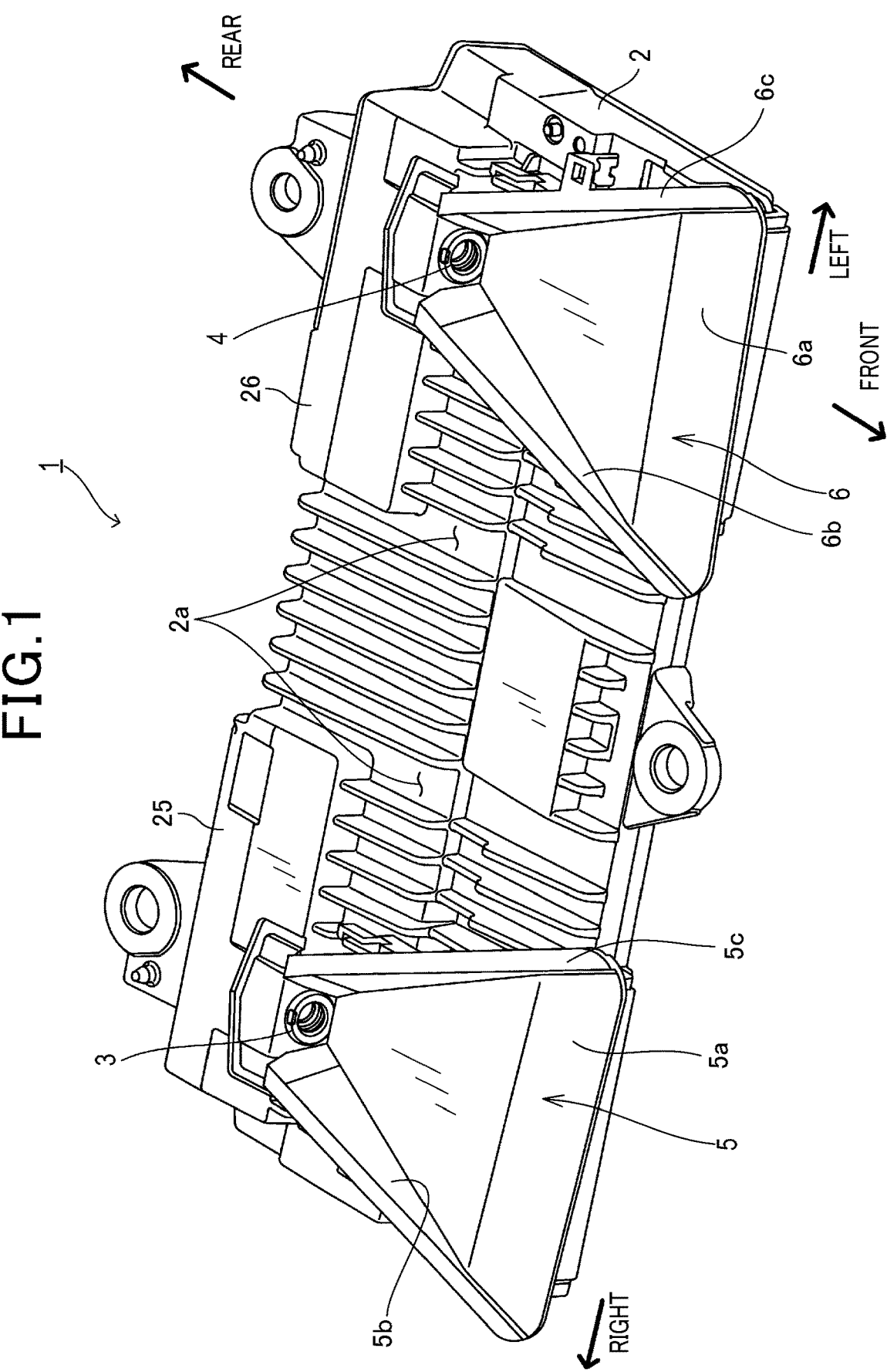
FIG. 1 is a perspective view schematically illustrating an example of the configuration of a stereo camera according to a first exemplary embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

The following describes a stereo camera 1 according to the exemplary embodiment with reference to FIGS. 1 to 5.

Referring to for example FIG. 1, the stereo camera 1 is mounted to the inner surface of a front windshield, referred to simply as a windshield, of a vehicle and disposed in the interior of the vehicle. The stereo camera 1 is located close to the rearview mirror of the vehicle. The stereo camera 1 is capable of capturing images of a predetermined image region defined in front of the vehicle.

In the specification, the directions defined for the stereo camera 1 or each element of the stereo camera 1 are identical to the directions defined for the stereo camera 1 or each element of the stereo camera 1 while the stereo camera 1 is mounted to the windshield.

This therefore results in the front and rear directions defined for the stereo camera 1 or each element of the stereo camera 1 being identical to the respective front and rear directions of the vehicle. Similarly, this results in the right and left directions defined for the stereo camera 1 or each element of the stereo camera 1 being identical to the respective right and left directions of the vehicle, and upper and lower directions defined for the stereo camera 1 or each element of the stereo camera 1 being identical to the respective upper and lower directions of the vehicle.

Referring to FIG. 1, the stereo camera 1 includes a housing 2 made of, for example, a metal material, a right lens module 3, a left lens module 4, a right hood 5, and a left hood 6. The right and left lens modules 3 and 4 will be collectively referred to as lens modules 3 and 4.

The housing 2 has a predetermined linear expansion coefficient and also has a substantially rectangular parallelepiped shape with an inner hollow container space. The housing 2 has a top surface 2a slightly inclined toward the front of the vehicle. A rectangular part of the right end portion of the top surface 2a is protruded upward to form a right protruded portion 25. Similarly, a rectangular part of the left end portion of the top wall 2a is protruded upward to form a left protruded portion 26.

Each of the right and left protruded portions 25 and 26 serves as an attachment to, for example, the inner surface of the windshield of the vehicle.

The right protruded portion 25 has a front surface through which a circular right opening is formed; the right opening serves to communicate between the outside and inside of the housing 2. The left protruded portion 26 has a front surface through which a circular left opening is formed; the left opening serves to communicate between the outside and inside of the housing 2.

The stereo camera 1 includes a right imager 27 and a left imager 28 installed in the housing 2.

Each of the right and left imagers 27 and 28 includes an image sensor, such as a known charge-coupled device (CCD) image sensor or a complementary metal-oxide-semiconductor (CMOS) image sensor, that is comprised of light-sensitive elements; the light-sensitive elements serve as pixels and are arranged in a two-dimensional array. That is, the array of the pixels is configured as a predetermined number of columns by a predetermined number of rows.

The right lens module 3 is installed in the housing 2 such that at least part of the right lens module 3 is exposed from the right opening. This enables incident light to enter the right lens module 3, and thereafter to be imaged on the right receiving area 27a of the right imager 27 (see FIG. 2). Similarly, the left lens module 4 is installed in the housing 2 such that at least part of the left lens module 4 is exposed from the left opening, enabling incident light to enter the left lens module 4 so as to be imaged on the left receiving area 28a of the left imager 28 (see FIG. 2).

The housing 2 has a trapezoidal right concave recess formed in the top surface 2a downward and located in front of the right opening such that the width of the right concave recess in the right-left direction of the vehicle increases toward the front of the vehicle. This enables an imaging region of the right imager 27 through the right lens module 3 to be established in front of the right lens module 3. Similarly, the housing 2 has a trapezoidal left concave recess formed in the top surface 2a downward and located in front of the left opening such that the width of the left concave recess in the right-left direction of the vehicle increases toward the front of the vehicle. This enables an imaging region of the left imager 28 through the left lens module 4 to be established in front of the left lens module 4.

Each of the right and left hoods 5 and 6 is made of, for example, a resin.

The right hood 5 includes a trapezoidal bottom wall 5a having shorter and longer sides parallel with each other. The right hood 5 also includes two sidewalls 5b and 5c projecting upward from the respective lateral sides of the bottom wall 5a.

The right hood 5 is fitted in the right concave recess such that the shorter side of the bottom wall 5a of the right hood 5 is closer to the right lens module 3 than the longer side is. The sidewalls 5b and 5c of the right hood 5 are located in front of the right lens module 3 and located outside the imaging region defined by the right lens module 3. In other words, the sidewalls 5b and 5c of the right hood 5 serve as partitions that separate the imaging region defined by the right lens module 3 from the outside. This configuration and arrangement of the right hood 5 prevent scenes located outside the imaging region defined by the right lens module 3 from being received by the right imager 27 via the right lens module 3.

The left hood 6 includes a trapezoidal bottom wall 6a having shorter and longer sides parallel with each other. The left hood 6 also includes two sidewalls 6b and 6c projecting upward from the respective lateral sides of the bottom wall 6a.

The left hood 6 is fitted in the left concave recess such that the shorter side of the bottom wall 6a of the left hood 6 is closer to the left lens module 4 than the longer side is. The sidewalls 6b and 6c of the left hood 6 are located in front of the left lens module 4 and located outside the imaging region defined by the left lens module 4. In other words, the sidewalls 6b and 6c of the left hood 6 serve as partitions that separate the imaging region defined by the left lens module 4 from the outside. This configuration and arrangement of the left hood 6 prevent objects located outside the imaging region defined by the left lens module 4 from being imaged by the left imager 28 via the left lens module 4.

Figure 2:
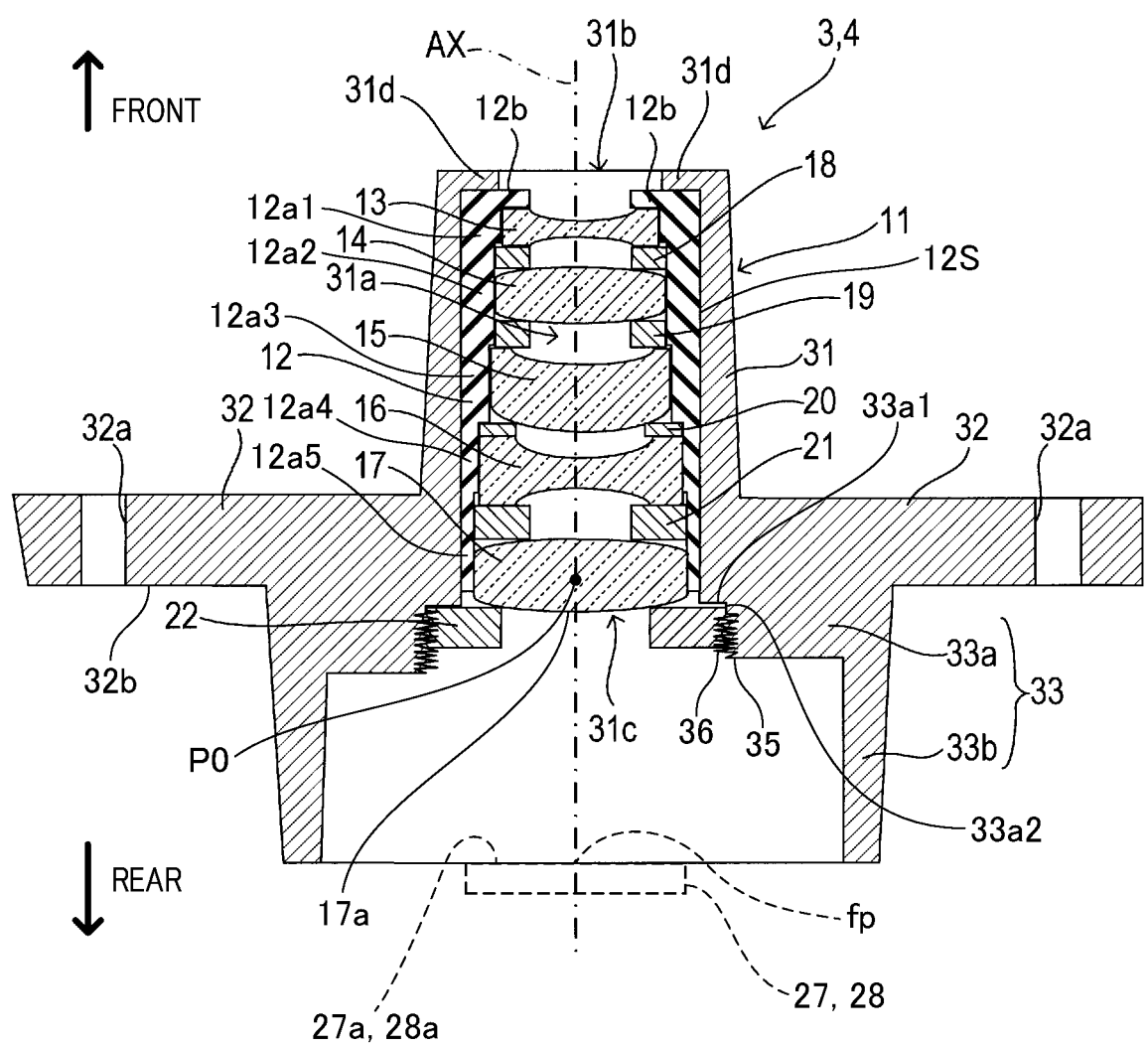
FIG. 2 is an axial cross-sectional view schematically illustrating each of lens modules illustrated in FIG. 1.

Referring to FIG. 2, each of the lens module 3 and 4 includes a lens barrel 11, an eccentricity restriction member 12, lenses 13, 14, 15, 16, and 17, spacer rings 18, 19, 20, and 21, and a securing ring serving as, for example, a securing member, 22.

The lens barrel 11 is made of, for example, a metal material, and is configured to hold the lenses 13 to 17 such that the lenses 13 to 17 have a common optical axis AX and the optical axis AX is coaxial with the corresponding one of the circular right and left openings. The lens barrel 11 has a linear expansion coefficient that is adjusted to be identical to the linear expansion coefficient of the housing 2.

Specifically, the lens barrel 11 includes a tubular body 31, a lens attachment 32, and a tubular base 33.

The tubular body 31 includes a tubular container hole 31a extending coaxially with the corresponding one of the right and left openings in the front-rear direction of the vehicle. The tubular body 31 also includes a front opening 31b located at its front end to communicate with the tubular container hole 31a, and a rear opening 31c located at its rear end to communicate with the tubular container hole 31a. The front end, i.e. the front opening 31b, of the tubular body 31 is exposed from the corresponding right or left opening of the housing 2. This enables light to be incident into the tubular body 31 via the front opening 31b.

The lenses 13 to 17 are disposed in the tubular container hole 31a of the tubular body 31 to be coaxially aligned with each other. In other words, the lenses 13 to 17 are disposed in the tubular container hole 31a of the tubular body 31 such that the lenses 13 to 17 have the common optical axis AX. The tubular body 31 includes a ring holder or a ring stopper, i.e. an inner flange, 31d that projects inwardly from the inner edge of the front end thereof toward the optical axis AX of the lenses 13 to 17. In other words, the front opening 31b is formed in the ring holder 31d.

The lens attachment 32 has a substantially circular plate-like shape, and radially extends from the outer edge of the rear end of the tubular body 31. The lens attachment 32 has through holes 32a each formed therethrough along the optical axis AX of the lenses 13 to 17. The lens attachment 32 also includes unillustrated bolts fitted through the respective through holes 32a. That is, when the lens attachment 32 of the tubular body 31 of each of the lens modules 3 is located at a predetermined position with respect to the housing 2, the unillustrated bolts fitted through the respective holes 32a are threadably fitted in corresponding unillustrated holes of the housing 2, resulting in each of the lens modules 3 and 4 being fastened to the housing 2.

The tubular base 33 extends from the rear end of the tubular body 31 and a rear surface 32b of the lens attachment 32 to be coaxial with the optical axis AX in the rear direction opposite to the extending direction of the tubular body 31 from the lens attachment 32.

The tubular base 33 includes a smaller diameter tubular portion 33a and a larger diameter tubular portion 33b.

The smaller diameter tubular portion 33a extends from the rear end of the tubular body 31 and the rear surface 32b of the lens attachment 32 in the rear direction of the vehicle to be coaxial with the optical axis AX. The smaller diameter tubular portion 33a has a diameter longer than a diameter of the rear opening 31c of the tubular body 31. That is, the smaller diameter tubular portion 33a is comprised of an annular seat portion 33a1 extends outwardly from the outer edge of the rear opening 31c, and an annular inner peripheral edge 33a2 continuously extending from the outer edge of the annular seat portion 33a1 in the rear direction of the vehicle.

The annular inner peripheral edge 33a2 has threads 35 formed thereon.

The larger diameter tubular portion 33b extends from the rear end of the smaller diameter tubular portion 33a in the rear direction of the vehicle to be coaxial with the optical axis AX. The larger diameter tubular portion 33b has a diameter longer than the diameter of the smaller diameter tubular portion 33a.

The eccentricity restriction member 12 is designed as a tubular member composed of an elastic member fitted in the tubular container hole 31a to be coaxial with the tubular container hole 31a. The lenses 13 to 17 and the spacer rings 18 to 21 are installed in the inside of the eccentricity restriction member 12 to be coaxial with the tubular container hole 31a. The eccentricity restriction member 12 has an outer periphery 12S that is in contact with the inner periphery of the tubular body 31.

When the eccentricity restriction member 12 is separated from the tubular container hole 31a, the eccentricity restriction member 12 has an outer diameter D1 that is slightly longer than an inner diameter D2 of the tubular container hole 31a. While the eccentricity restriction member 12 is fitted in the tubular container hole 31a, the outer diameter of the eccentricity restriction member 12 is in conformity with the inner diameter D2 of the tubular container hole 31a.

Specifically, the eccentricity restriction member 12 is integrally comprised of

1. A first tubular portion 12a1 having a predetermined first inner diameter
2. A second tubular portion 12a2 having a second inner diameter
3. A third tubular portion 12a3 having a third inner diameter
4. A fourth tubular portion 12a4 having a fourth inner diameter
5. A fifth tubular portion 12a5 having a fifth inner diameter The fifth tubular portion 12a5 is located to be closest to the rear end of the tubular body 31 in all the tubular portions 12a1 to 12a5. The fourth tubular portion 12a4 continuously extends from the front end of the fifth tubular portion 12a5 such that the fourth inner diameter is shorter than the fifth inner diameter. The third tubular portion 12a3 continuously extends from the front end of the fourth tubular portion 12a4 such that the third inner diameter is shorter than the fourth inner diameter. The second tubular portion 12a2 continuously extends from the front end of the third tubular portion 12a3 such that the second inner diameter is shorter than the third inner diameter. The first tubular portion 12a1 continuously extends from the front end of the second tubular portion 12a2 such that the first inner diameter is shorter than the second inner diameter.

The eccentricity restriction member 12 includes a ring holder or a ring stopper, i.e. an inner flange, 12b that projects inwardly from the inner edge of the front end of the first tubular portion 12a1 toward the optical axis AX of the lenses 13 to 17. The ring holder 12b is located to be closely attached to the ring holder 31d of the tubular body 11.

The lenses 13 to 17 have different diameters from each other. As described above, the lenses 13 to 17 are disposed in the eccentricity restriction member 12 while the optical axis AX of the lenses 13 to 17 is coaxial with the center axis of the eccentricity restriction member 12.

Specifically, the lens 17 is designed as, for example, a biconvex lens, and has a diameter that is substantially in conformity with the fifth inner diameter of the fifth tubular portion 12a5. The lens 17 is coaxially fitted in the fifth tubular portion 12a5, so that the inner periphery of the fifth tubular portion 12a5 surrounds the outer periphery of the lens 17 while elastically biasing, i.e. pressing, the outer periphery of the lens 17 inwardly. That is, the fifth tubular portion 12a5 of the eccentricity restriction member 12 enables the optical axis of the lens 17 to be aligned with the center axis of the lens barrel 11.

The lens 16 is designed as, for example, a biconcave lens, and has a diameter that is substantially in conformity with the fourth inner diameter of the fourth tubular portion 12a4. The lens 16 is coaxially fitted in the fourth tubular portion 12a4, so that the inner periphery of the fourth tubular portion 12a4 surrounds the outer periphery of the lens 16 while elastically biasing, i.e. pressing, the outer periphery of the lens 16 inwardly. That is, the fourth tubular portion 12a4 of the eccentricity restriction member 12 enables the optical axis of the lens 16 to be aligned with the center axis of the lens barrel 11.

The lens 15 is designed as, for example, a convex meniscus lens that is concave toward the rear direction of the vehicle, and has a diameter that is substantially in conformity with the third inner diameter of the third tubular portion 12a3. The lens 15 is coaxially fitted in the third tubular portion 12a3, so that the inner periphery of the third tubular portion 12a3 surrounds the outer periphery of the lens 15 while elastically biasing, i.e. pressing, the outer periphery of the lens 15 inwardly. That is, the third tubular portion 12*a*3 of the eccentricity restriction member 12 enables the optical axis of the lens 15 to be aligned with the center axis of the lens barrel 11.

The lens 14 is designed as, for example, a biconvex lens, and has a diameter that is substantially in conformity with the fourth inner diameter of the second tubular portion 12*a*2. The lens 14 is coaxially fitted in the second tubular portion 12*a*2, so that the inner periphery of the second tubular portion 12*a*2 surrounds the outer periphery of the lens 14 while elastically biasing, i.e. pressing, the outer periphery of the lens 14 inwardly. That is, the second tubular portion 12*a*2 of the eccentricity restriction member 12 enables the optical axis of the lens 14 to be aligned with the center axis of the lens barrel 11.

The lens 13 is designed as, for example, a biconcave lens, and has a diameter that is substantially in conformity with the first inner diameter of the first tubular portion 12*a*1. The lens 13 is coaxially fitted in the first tubular portion 12*a*1 while being intimate contact with the ring holder 12*b*, so that the inner periphery of the first tubular portion 12*a*1 surrounds the outer periphery of the lens 13 while elastically biasing, i.e. pressing, the outer periphery of the lens 13 inwardly. That is, the first tubular portion 12*a*1 of the eccentricity restriction member 12 enables the optical axis of the lens 13 to be aligned with the center axis of the lens barrel 11.

That is, the lens 13 to 17 are successively disposed in the eccentricity restriction member 12 in this order from the front end of the eccentricity restriction member 12 to the rear end of the eccentricity restriction member 12 while the diameters of the respective lenses 13 to 17 are successively longer.

The spacer ring 21 is coaxially fitted in the fifth tubular portion 12*a*5 while being interposed between the lenses 16 and 17. The spacer ring 20 is coaxially fitted in the fourth tubular portion 12*a*4 while being interposed between the lenses 15 and 16. The spacer ring 19 is coaxially fitted in the second tubular portion 12*a*2 while being interposed between the lenses 14 and 15. The spacer ring 18 is coaxially fitted in the second tubular portion 12*a*2 while being interposed between the lenses 13 and 14.

Each of the spacer rings 18 to 21 is made of, for example, a material having a predetermined modulus of elasticity that is higher than the modulus of elasticity of the material of the eccentricity restriction member 12.

The securing ring 22 is made of, for example, a metal member. The securing ring 22 has threads 36 formed on and over the outer periphery thereof. The securing ring 22 is fitted in the annular inner peripheral edge 33*a*2 while being in contact with the periphery of an outer major surface 17*a* of the lens 17 such that (1) The securing ring 22 pushes the lens 17 toward the front direction of the vehicle (2) The threads 36 of the securing ring 22 are engaged with the threads 35 of the annular inner peripheral edge 33*a*2.

Threadably engaging the securing ring 22 with the annular inner peripheral edge 33*a*2 of the tubular base 33 fastens the securing ring 22 to the lens barrel 11.

The focal length of the lens 17 is defined as the distance between the principal point PO of the lens 41 and a predetermined focal point fp of the lens 17. That is, each of the imager 27 and 28 is arranged such that the center of the corresponding light receiving area 27*a*, 28*a* is located to be coaxial with the optical axis AX of the lenses 13 to 17, and the center of the corresponding light receiving area 27*a*, 28*a* is substantially located at the focal point fp of the lens 17.

The stereo camera 1 is configured such that (1) The optical axis AX of the right lens module 3 and the optical axis AX of the left lens module 4 have the same height (2) The minimum distance, i.e. interval, between the optical axis AX of the right lens module 3 and the optical axis AX of the left lens module 4 is set to a predetermined length The assembly of the right lens module 3 and the right imager 27, which will be referred to as a right imaging unit, enables light incident from the imaging region into the right lens module 3 to be received on the light receiving area 27*a* of the right imager 27, so that a right image based on the entered light is generated. Similarly, the assembly of the left lens module 4 and the left imager 28, which will be referred to as a left imaging unit, enables light incident from the imaging region into the left lens module 4 to be received on the light receiving area 28*a* of the left imager 28, so that a left image based on the entered light is generated. An unillustrated processing circuit, which is installed in the housing 2 and communicable with the right and left imagers 27 and 28, is programmed to calculate disparity information between each pair of two corresponding points between the right and left images based on the interval between the optical axes AX of the right and left lens modules 3 and 4 and the focal length of each of the right and left lens modules 3 and 4. This makes it possible to measure the distance between the vehicle and a target object captured in each of the right and left images.

Next, the following describes an example of the procedure of assembling each of the lens modules 3 and 4.

First, the eccentricity reduction member 12, which is configured as set forth above and illustrated in FIG. 2, was prepared, and the lens barrel 11, which is configured as set forth above and illustrated in FIG. 2, was also prepared.

Figure 3:
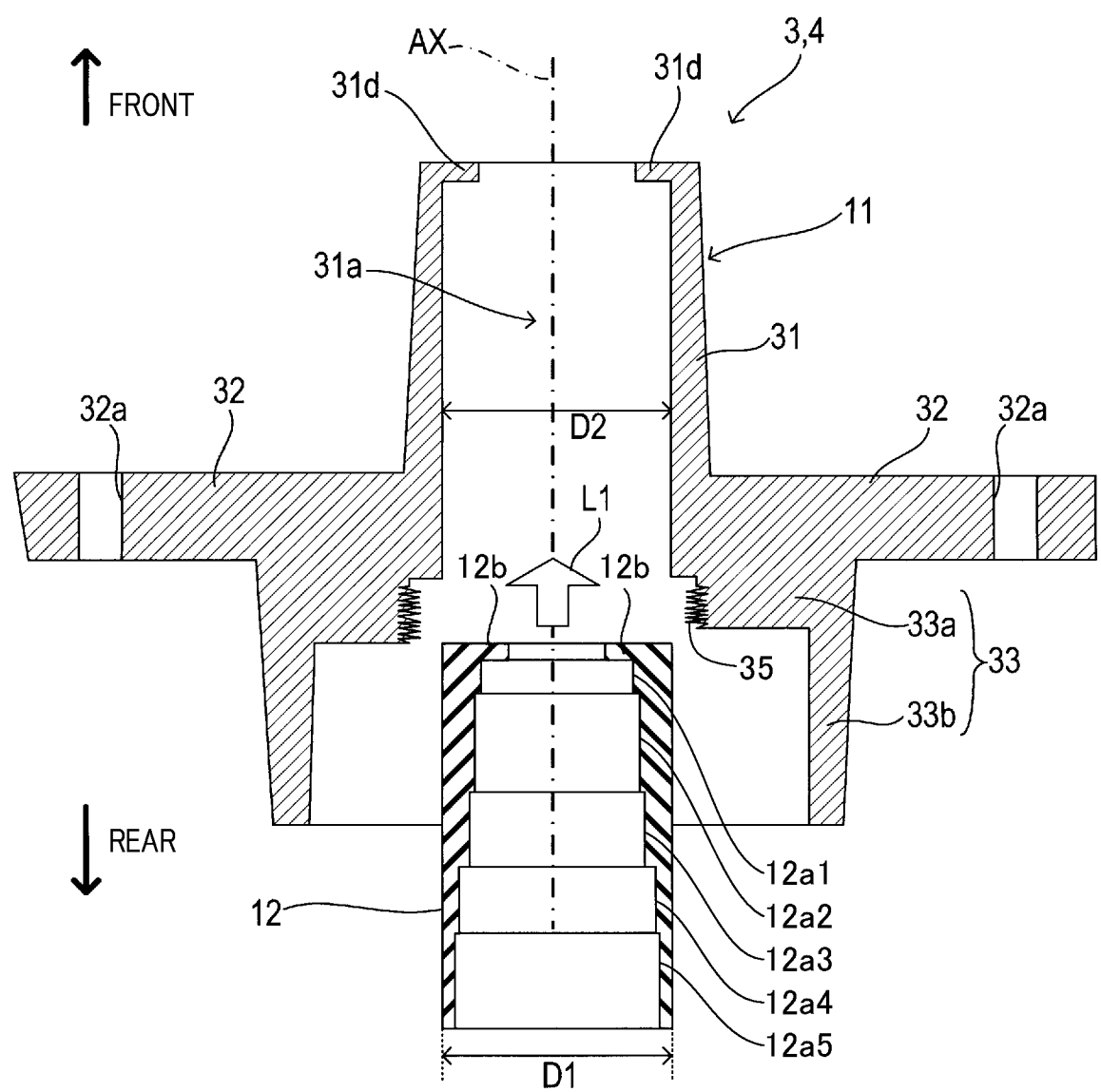
FIG. 3 is an axial cross-sectional view schematically illustrating a situation where an eccentricity reduction member is inserted into a tubular body illustrated in FIG. 1.

Then, as illustrated in FIG. 3, the eccentricity reduction member 12 was arranged such that the ring holder 12*b*, i.e. front end, of the eccentricity reduction member 12 coaxially faced the rear opening 31*c* of the tubular container hole 31*a* of the tubular body 31. After this arrangement, the eccentricity reduction member 12 was inserted from the first end of the eccentricity reduction member 12 into the tubular container hole 31*a* of the tubular body 31 via the rear opening 31*c*.

In this inserting step, because the outer diameter D1 of the eccentricity reduction member 12 separated from the tubular body 31 is slightly longer than the inner diameter D2 of the tubular container hole 31*a*, the eccentricity reduction member 12 was pressed in the front direction (see arrow L1 in FIG. 3) to be pushed into the tubular container hole 31*a*. When the ring holder 12*b* of the eccentricity reduction member 12 was abutted onto the ring holder 31*d* of the tubular body 31, the insertion of the eccentricity reduction member 12 was completed, resulting in the eccentricity reduction member 12 was fixedly installed in the tubular container hole 31*a* while the ring holder 12*b* of the eccentricity reduction member 12 was in contact with the ring holder 31*d* of the tubular body 31.

Figure 4:
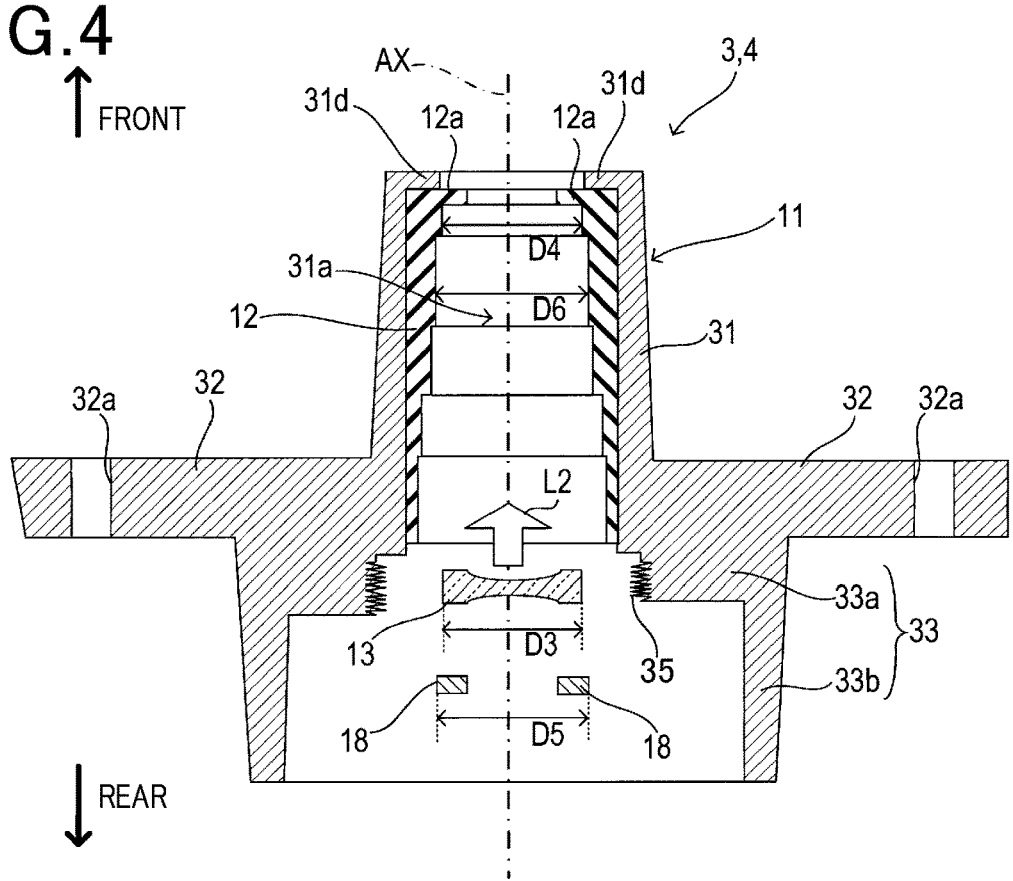
FIG. 4 is an axial cross-sectional view schematically illustrating a situation where a lens and a spacer ring are inserted into the eccentricity reduction member illustrated in FIG. 1.

Then, as illustrated in FIG. 4, the lens 13 was inserted into the eccentricity reduction member 12 so as to be fitted into the first tubular portion 12*a*1 of the eccentricity reduction member 12.

In this inserting step, the outer diameter of the lens 13, which is illustrated by D3 in FIG. 3, is slightly longer than the first inner diameter (see reference character D4 in FIG.

3) of the first tubular portion 12a1 of the eccentricity restriction member 12 while no member was fitted in the first tubular portion 12a1. For this reason, the lens 13 was pressed in the front direction (see arrow L2 in FIG. 4) to be pushed into the first tubular portion 12a1 of the eccentricity restriction member 12.

When the lens 13 was abutted onto the ring holder 12b of the eccentricity restriction member 12, the lens 13 was fitted in the first tubular portion 12a1 of the eccentricity reduction member 12.

After fixture of the lens 13 in the first tubular portion 12a1, the spacer ring 18 was inserted into the eccentricity reduction member 12, so that the spacer ring 18 was fitted in the second tubular portion 12a2 of the eccentricity reduction member 12, and that the spacer ring 18 was abutted onto the lens 13.

In this inserting step, the outer diameter of the spacer ring 18, which is illustrated by D5 in FIG. 3, is slightly longer than the second inner diameter (see reference character D6 in FIG. 4) of the second tubular portion 12a2 of the eccentricity restriction member 12 while no member was fitted in the second tubular portion 12a2. For this reason, the spacer ring 18 was pressed in the front direction (see the arrow L2 in FIG. 4) to be pushed into the second tubular portion 12a2 of the eccentricity restriction member 12.

After the sequential inserting steps of the lens 13 and spacer ring 18, the lens 14 and the spacer ring 19 were sequentially inserted into the eccentricity reduction member 12 in the same approach as the sequential inserting steps of the lens 13 and spacer ring 18. This resulted in the lens 14 and the spacer ring 19 being fitted in the second tubular portion 12a2 of the eccentricity restriction member 12. After the sequential inserting steps of the lens 14 and spacer ring 19, the lens 15 and the spacer ring 20 were sequentially inserted into the eccentricity reduction member 12 in the same approach as the sequential inserting steps of the lens 13 and spacer ring 18. This resulted in the lens 15 being fitted in the third tubular portion 12a3 of the eccentricity restriction member 12, and the spacer ring 20 being fitted in the fourth tubular portion 12a4 of the eccentricity restriction member 12.

After the sequential inserting steps of the lens 15 and spacer ring 20, the lens 16 and the spacer ring 21 were sequentially inserted into the eccentricity reduction member 12 in the same approach as the sequential inserting steps of the lens 13 and spacer ring 18. This resulted in the lens 16 being fitted in the fourth tubular portion 12a4 of the eccentricity restriction member 12, and the spacer ring 21 being fitted in the fifth tubular portion 12a5 of the eccentricity restriction member 12.

After the sequential inserting steps of the lens 16 and spacer ring 21, the lens 17 was inserted into the eccentricity reduction member 12 in the same approach as the inserting step of the lens 13. This resulted in the lens 17 being fitted in the fifth tubular portion 12a5 of the eccentricity restriction member 12.

Figure 5:
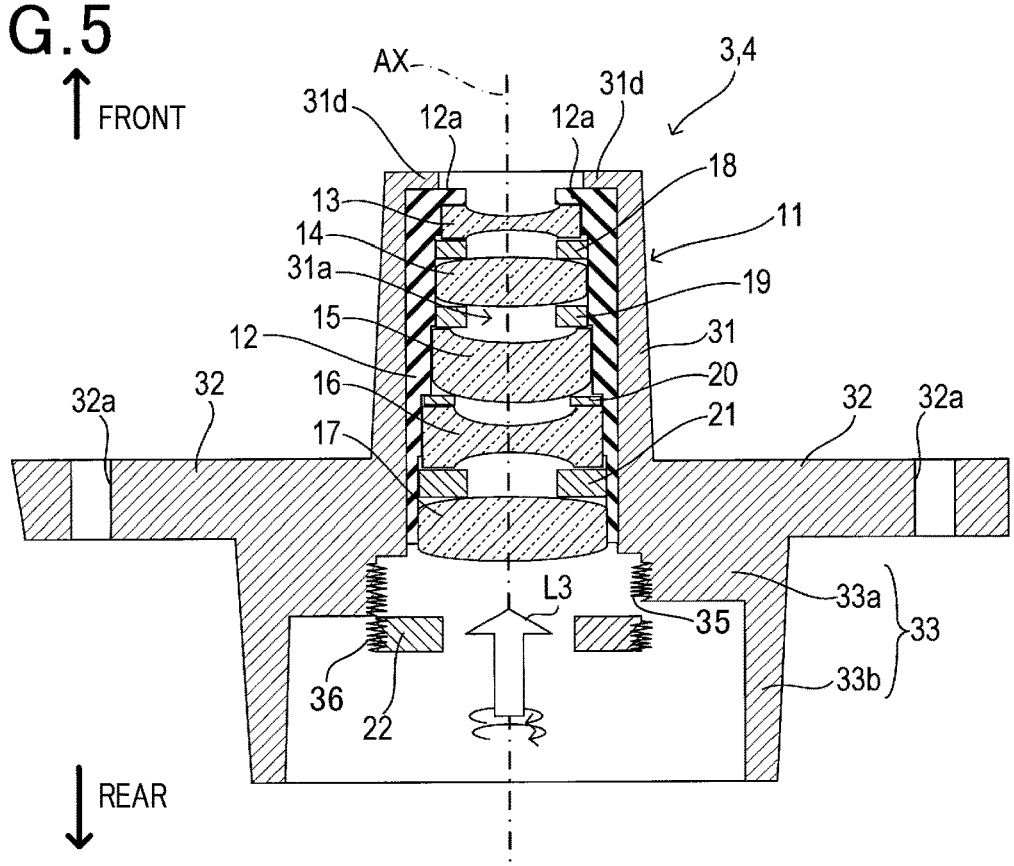
FIG. 5 is an axial cross-sectional view schematically illustrating a situation where a securing ring is inserted into a small diameter tubular portion of a lens barrel illustrated in FIG. 1.

Thereafter, while the threads 36 of the secure ring 22 were partly engaged with the threads 35 of the annular inner peripheral edge 33a2, the secure ring 22 was screwed into the annular inner peripheral edge 33a2, resulting in the secure ring 22 being moved in the front direction (see arrow L3 in FIG. 5). When the secure ring 22 was in contact with the periphery of the outer major surface 17a of the lens 17, the securing ring 22 was fixedly fitted in the annular inner peripheral edge 33a2 while pressing, i.e. urging, the lens 17 toward the front direction of the vehicle. This resulted in the eccentricity reduction member 12, the lenses 13 to 17, and the spacer rings 18 to 21 being installed in the tubular body 11 while being biased toward the front direction of the vehicle.

Each of the lens modules 3 and 4 configured above includes the lenses 13 to 17, the tubular body 31, and the eccentricity reduction member 12.

The tubular body 31 has a predetermined length in its axial direction. The tubular body 31 has the front opening 31b communicating with the interior of the tubular body 31; the front opening 31b is configured to enable light to be incident into the tubular body 31 therethrough. The tubular body 31 also has the rear opening 31c communicating with the interior of the tubular body 31.

The lenses 13 to 17 are disposed in the tubular body 31 such that the lenses 13 to 17 have the common optical axis AX.

The eccentricity restriction member 12 is comprised of an elastic tubular member coaxially disposed in the tubular body 31 such that (1) The outer periphery 12S is in contact with the inner periphery of the tubular body 31

(2) The inner periphery of each of the first to fifth tubular portions 12a1 to 12a5 surrounds the outer periphery of the corresponding one of the lenses 13 to 17 while inwardly biasing the outer periphery of the corresponding one of the lenses 13 to 17

The eccentricity restriction member 12 also includes the ring holder 12b that projects inwardly from the inner edge of the front end thereof toward the optical axis AX of the lenses 13 to 17.

That is, each of the lens modules 3 and 4 is configured such that the eccentricity restriction member 12 is disposed between the inner periphery of the tubular body 31 and the lenses 13 to 17 to surround the outer periphery of each of the lenses 13 to 17 while inwardly biasing the outer periphery of the corresponding one of the lenses 13 to 17.

This configuration prevents each of the lenses 13 to 17 from being thermally expanded.

This configuration also enables, even if at least one of the lenses 13 to 17 is thermally expanded, the corresponding at least one of the first to fifth tubular portions 12a1 to 12a5 to elastically press the outer periphery of at least one of the lenses 13 to 17 inwardly, making it possible to restrict movement of the at least one of the lenses 13 to 17 in a radial direction perpendicular to the optical axis AX.

Similarly, this configuration enables, even if the tubular body 31 is thermally expanded, the first to fifth tubular portions 12a1 to 12a5 to elastically press the outer peripheries of the respective lenses 13 to 17 inwardly, making it possible to restrict movement of the at least one of the lenses 13 to 17 in a radial direction perpendicular to the optical axis AX.

Each of the lens modules 3 and 4 is configured such that the lens 13 is coaxially fitted in the rear end of the tubular body 31 while being intimate contact with the ring holder 12b. This results in the friction between the ring holder 12b and the lens 13 further restricting radial movement of the lens 13, which is perpendicular to the optical axis AX.

Each of the lens modules 3 and 4 is configured such that the ring holder 12b is closely attached to the ring holder 31d of the front end of the tubular body 31. This results in the friction between the ring holder 12b and the ring holder 31d reducing radial movement of the eccentricity restriction member 12, which is perpendicular to the optical axis AX. This therefore makes it possible to restrict radial movement of the lenses 13 to 17, which is perpendicular to the optical axis AX.

The stereo camera 1 includes the right and left lens modules 3 and 4. As described above, the stereo camera 1 is configured to calculate disparity information between each pair of two corresponding points between the right and left images captured by the respective imagers 27 and 28 based on the interval between the optical axes AX of the right and left lens modules 3 and 4 and the focal length of each of the right and left lens modules 3 and 4. Radial movement of at least one of the lenses 13 to 17, which is perpendicular to the optical axis AX, might therefore cause an error in the disparity information obtained by the stereo camera 1.

The stereo camera 1 according to the first embodiment is however configured to restrict radial movement of each of the lenses 13 to 17 described above, thus reducing the occurrence of an error in the disparity information obtained by the stereo camera 1. This therefore prevents the measurement accuracy of the distance of each target object relative to the vehicle from deteriorating.

The eccentricity restriction member 12 is disposed in the tubular body 31 to extend from the front end of the tubular body 31 to the rear end of the tubular body 31. This configuration enables arrangement of the eccentricity restriction member 12 in the tubular body 31 of each lens module 3 and 4 to coaxially locate the lenses 13 to 17 in the tubular body 31. This therefore simplifies the method of assembling each of the lens modules 3 and 4.

Each of the lens modules 3 and 4 includes the spacer ring 21 interposed between the first and second lenses 17 and 16, the spacer ring 20 interposed between the second and third lenses 16 and 15, the spacer ring 19 interposed between the third and fourth lenses 15 and 14, and the spacer ring 18 interposed between the fourth and fifth lenses 14 and 13. Each of the spacer rings 18 to 21 is made of, for example, a material having a predetermined modulus of elasticity that is higher than the modulus of elasticity of the material of the eccentricity restriction member 12.

This configuration of each of the lens modules 3 and 4 enables adjustment of the thickness of each of the spacer rings 18 to 21 to desirably change the internal between the corresponding adjacent lenses.

The stereo camera 1 is configured such that the linear expansion coefficient of the tubular body 31 is set to be identical to the linear expansion coefficient of the housing 2. This configuration therefore prevents the optical axis AX of each of the lens modules 3 and 4 from being deviated from its original axis due to the difference in liner expansion coefficient between the tubular body 31 and the housing 2.

Second Embodiment

Figure 6:
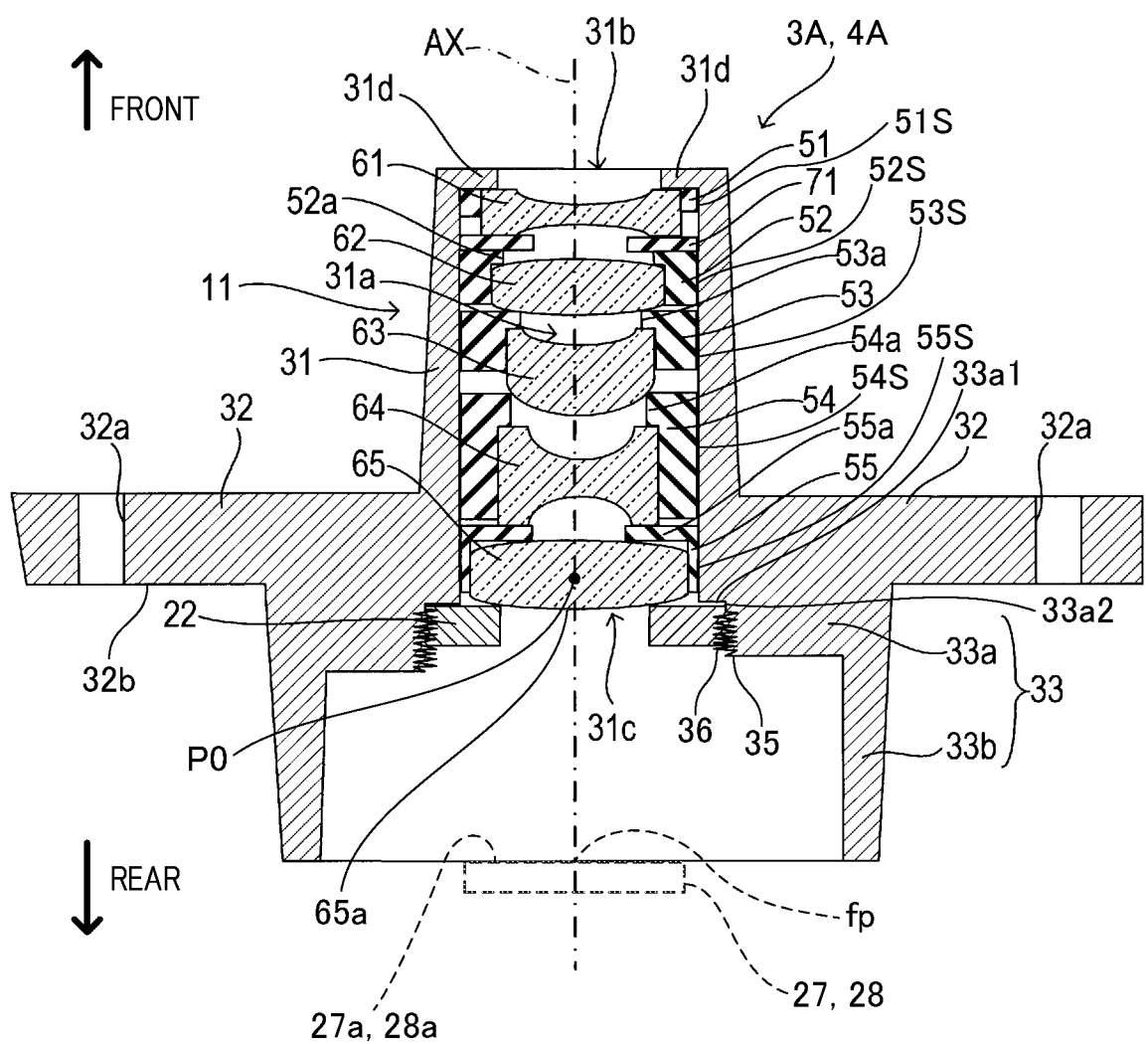
FIG. 6 is an axial cross-sectional view schematically illustrating each of lens modules according to a second exemplary embodiment of the present disclosure.

The following describes a stereo camera 1A according to the second embodiment of the present disclosure with reference to FIG. 6. The configuration and functions of the stereo camera 1A according to the second embodiment are mainly different from those of the stereo camera 1 according to the first embodiment by the following points. The following therefore mainly describes the different points.

As illustrated in FIG. 6, the stereo camera 1A includes each of lens modules 3A and 4A. Each of the lens modules 3A and 4A includes (1) Lenses 61 to 65 in place of the lenses 13 to 17
(2) Eccentricity restriction members 51 to 55 in place of the eccentricity restriction member 12
(3) A spacer ring 71 in place of the spacer rings 18 to 21

The lenses 61 to 65 are disposed in the tubular container hole 31a of the tubular body 31 to be coaxially aligned with each other. In other words, the lenses 61 to 65 are disposed in the tubular container hole 31a of the tubular body 31 such that the lenses 61 to 65 have the common optical axis AX.

The eccentricity restriction member 51 is designed as a tubular member composed of an elastic member fitted in the tubular container hole 31a to be coaxial with the tubular container hole 31a. The lens 61 is installed in the inside of the eccentricity restriction member 51 to be coaxial with the tubular container hole 31a.

The eccentricity restriction member 51 has an outer periphery 51S that is in contact with the inner periphery of the tubular body 31.

When the eccentricity restriction member 51 is separated from the tubular container hole 31a, the eccentricity restriction member 51 has an outer diameter that is slightly longer than the inner diameter D2 of the tubular container hole 31a (see FIG. 3). While the eccentricity restriction member 51 is fitted in the tubular container hole 31a, the outer diameter of the eccentricity restriction member 51 is in conformity with the inner diameter D2 of the tubular container hole 31a.

The eccentricity restriction member 52 is designed as a tubular member composed of an elastic member fitted in the tubular container hole 31a to be coaxial with the tubular container hole 31a. The lens 62 is installed in the inside of the eccentricity restriction member 52 to be coaxial with the tubular container hole 31a.

The eccentricity restriction member 52 has an outer periphery 52S that is in contact with the inner periphery of the tubular body 31.

When the eccentricity restriction member 52 is separated from the tubular container hole 31a, the eccentricity restriction member 52 has an outer diameter that is slightly longer than the inner diameter D2 of the tubular container hole 31a (see FIG. 3). While the eccentricity restriction member 52 is fitted in the tubular container hole 31a, the outer diameter of the eccentricity restriction member 52 is in conformity with the inner diameter D2 of the tubular container hole 31a.

The eccentricity restriction member 52 includes a ring holder or a ring stopper, i.e. an inner flange, 52a that projects inwardly from the inner edge of the front end thereof toward the optical axis AX of the lenses 61 to 65. The ring holder 52a is located to be closely attached to the outer periphery of a front major surface of the lens 62.

The eccentricity restriction member 53 is designed as a tubular member composed of an elastic member fitted in the tubular container hole 31a to be coaxial with the tubular container hole 31a. The lens 63 is installed in the inside of the eccentricity restriction member 53 to be coaxial with the tubular container hole 31a.

The eccentricity restriction member 53 has an outer periphery 53S that is in contact with the inner periphery of the tubular body 31.

When the eccentricity restriction member 53 is separated from the tubular container hole 31a, the eccentricity restriction member 53 has an outer diameter that is slightly longer than the inner diameter D2 of the tubular container hole 31a (see FIG. 3). While the eccentricity restriction member 53 is fitted in the tubular container hole 31a, the outer diameter of the eccentricity restriction member 53 is in conformity with the inner diameter D2 of the tubular container hole 31a.

The eccentricity restriction member 53 includes a ring holder or a ring stopper, i.e. an inner flange, 53a that projects inwardly from the inner edge of the front end thereof toward the optical axis AX of the lenses 61 to 65. The ring holder 53a is located to be closely attached to the outer periphery of a front major surface of the lens 63.

The eccentricity restriction member 54 is designed as a tubular member composed of an elastic member fitted in the tubular container hole 31a to be coaxial with the tubular container hole 31a. The lens 64 is installed in the inside of the eccentricity restriction member 54 to be coaxial with the tubular container hole 31a.

The eccentricity restriction member 54 has an outer periphery 54S that is in contact with the inner periphery of the tubular body 31.

When the eccentricity restriction member 54 is separated from the tubular container hole 31a, the eccentricity restriction member 54 has an outer diameter that is slightly longer than the inner diameter D2 of the tubular container hole 31a (see FIG. 3). While the eccentricity restriction member 54 is fitted in the tubular container hole 31a, the outer diameter of the eccentricity restriction member 54 is in conformity with the inner diameter D2 of the tubular container hole 31a.

The eccentricity restriction member 54 includes a ring holder or a ring stopper, i.e. an inner flange, 54a that projects inwardly from the inner edge of the front end thereof toward the optical axis AX of the lenses 61 to 65. The ring holder 54a is located to be closely attached to the outer periphery of a front major surface of the lens 64.

The eccentricity restriction member 55 is designed as a tubular member composed of an elastic member fitted in the tubular container hole 31a to be coaxial with the tubular container hole 31a. The lens 65 is installed in the inside of the eccentricity restriction member 55 to be coaxial with the tubular container hole 31a.

The eccentricity restriction member 55 has an outer periphery 55S that is in contact with the inner periphery of the tubular body 31.

When the eccentricity restriction member 55 is separated from the tubular container hole 31a, the eccentricity restriction member 54 has an outer diameter that is slightly longer than the inner diameter D2 of the tubular container hole 31a (see FIG. 3). While the eccentricity restriction member 55 is fitted in the tubular container hole 31a, the outer diameter of the eccentricity restriction member 55 is in conformity with the inner diameter D2 of the tubular container hole 31a.

The eccentricity restriction member 55 includes a ring holder or a ring stopper, i.e. an inner flange, 55a that projects inwardly from the inner edge of the front end thereof toward the optical axis AX of the lenses 61 to 65. The ring holder 55a is located to be closely attached to the outer periphery of a front major surface of the lens 65.

The eccentricity reduction member 55 is located to be closest to the rear end of the tubular body 31 in all the eccentricity reduction members 51 to 55. The eccentricity reduction member 54 is located to be adjacent to the eccentricity reduction member 55 with a space therebetween. The eccentricity reduction member 53 is located to be adjacent to the eccentricity reduction member 54 with a space therebetween. The eccentricity reduction member 52 is located to be adjacent to the eccentricity reduction member 53 with a space therebetween. The eccentricity reduction member 51 is located to be adjacent to the eccentricity reduction member 52 with a space therebetween.

The lens 65 is designed as, for example, a biconvex lens, and is coaxially fitted in the eccentricity reduction member 55, so that the inner periphery of the eccentricity reduction member 55 surrounds the outer periphery of the lens 65 while elastically biasing, i.e. pressing, the outer periphery of the lens 65 inwardly. That is, the eccentricity restriction member 55 enables the optical axis of the lens 65 to be aligned with the center axis of the lens barrel 11.

The lens 64 is designed as, for example, a biconcave lens, and is coaxially fitted in the eccentricity restriction member 54, so that the inner periphery of the eccentricity restriction member 54 surrounds the outer periphery of the lens 64 while elastically biasing, i.e. pressing, the outer periphery of the lens 64 inwardly. That is, the eccentricity restriction member 54 enables the optical axis of the lens 16 to be aligned with the center axis of the lens barrel 11.

The lens 63 is designed as, for example, a convex meniscus lens that is concave toward the rear direction of the vehicle, and is coaxially fitted in the eccentricity restriction member 53, so that the inner periphery of the eccentricity restriction member 53 surrounds the outer periphery of the lens 63 while elastically biasing, i.e. pressing, the outer periphery of the lens 63 inwardly. That is, the eccentricity restriction member 53 enables the optical axis of the lens 63 to be aligned with the center axis of the lens barrel 11.

The lens 62 is designed as, for example, a biconvex lens, and is coaxially fitted in the eccentricity restriction member 52, so that the inner periphery of the eccentricity restriction member 52 surrounds the outer periphery of the lens 62 while elastically biasing, i.e. pressing, the outer periphery of the lens 62 inwardly. That is, the eccentricity restriction member 52 enables the optical axis of the lens 62 to be aligned with the center axis of the lens barrel 11.

The lens 61 is designed as, for example, a biconcave lens, and is coaxially fitted in the eccentricity restriction member 51 while being intimate contact with the ring holder 31d, so that the inner periphery of the eccentricity restriction member 51 surrounds the outer periphery of the lens 61 while elastically biasing, i.e. pressing, the outer periphery of the lens 61 inwardly. That is, the eccentricity restriction member 51 enables the optical axis of the lens 61 to be aligned with the center axis of the lens barrel 11.

The spacer ring 71 is coaxially fitted in the tubular container hole 31a of the tubular body 31 while being interposed between the lens 61 and the eccentricity restriction member 52. When the spacer ring 71 is separated from the tubular container hole 31a, the spacer ring 71 has an outer diameter that is slightly longer than the inner diameter D2 of the tubular container hole 31a (see FIG. 3). While the spacer ring 71 is fitted in the tubular container hole 31a, the outer diameter of the spacer ring 71 is in conformity with the inner diameter D2 of the tubular container hole 31a.

That is, the eccentricity restriction member 51, the spacer ring 71, the eccentricity restriction member 52, the eccentricity restriction member 53, the eccentricity restriction member 54, and the eccentricity restriction member 55 are successively disposed in the tubular body 31 in this order from the front end of the tubular body 31 to the rear end of the tubular body 31. The lenses 61 to 65 are fitted in the respective eccentricity restriction members 51 to 55.

The securing ring 22 is fitted in the annular inner peripheral edge 33a2 while being in contact with the periphery of an outer major surface 65a of the lens 65 such that (1) The securing ring 22 pushes the lens 65 toward the front direction of the vehicle (2) The threads 36 of the securing ring 22 are engaged with the threads 35 of the annular inner peripheral edge 33a2. Threadably engaging the securing ring 22 with the annular inner peripheral edge 33a2 of the tubular base 33 fastens the securing ring 22 to the lens barrel 11.

Next, the following describes an example of the procedure of assembling each of the lens modules 3A and 4A.

First, the eccentricity reduction member 51, which is configured as set forth above and illustrated in FIG. 6, was prepared, and the lens barrel 11, which is configured as set forth above and illustrated in FIG. 2, was also prepared.

Then, the eccentricity reduction member 51 was inserted into the tubular container hole 31a of the tubular body 31 via the rear opening 31c.

In this inserting step, because the outer diameter of the eccentricity reduction member 51 separated from the tubular body 31 is slightly longer than the inner diameter D2 of the tubular container hole 31a, the eccentricity reduction member 51 was pressed in the front direction to be pushed into the tubular container hole 31a.

When the eccentricity reduction member 51 was abutted onto the ring holder 31d of the tubular body 31, the insertion of the eccentricity reduction member 51 was completed, resulting in the eccentricity reduction member 51 was fixedly installed in the tubular container hole 31a while the eccentricity reduction member 51 was in contact with the ring holder 31d of the tubular body 31.

Then, the lens 61 was inserted into the eccentricity reduction member 51 so as to be fitted into the eccentricity reduction member 51.

In this inserting step, the outer diameter of the lens 61 is slightly longer than the inner diameter of the eccentricity restriction member 51 while no member was fitted in the eccentricity restriction member 51. For this reason, the lens 61 was pressed in the front direction to be pushed into the eccentricity restriction member 51.

After fixture of the lens 61 in the eccentricity restriction member 51, the spacer ring 71 was inserted in the tubular container hole 31a of the tubular body 31, so that the spacer ring 71 was abutted onto the lens 61.

In this inserting step, the outer diameter of the spacer ring 71 is slightly longer than the inner diameter D2 of the tubular container hole 31a.

For this reason, the spacer ring 71 was pressed in the front direction to be abutted onto the lens 61.

After the inserting step of the spacer ring 71, the eccentricity restriction member 52 and the lens 62 were sequentially inserted into the tubular container hole 31a of the tubular body 31 in the same approach as the sequential inserting steps of the eccentricity restriction member 51 and the lens 61. This resulted in the eccentricity restriction member 52 being fitted in the tubular container hole 31a of the tubular body 31 while being abutted on the spacer ring 71, and the lens 52 is fitted in the eccentricity restriction member 52. After the sequential inserting steps of the eccentricity restriction member 52 and the lens 62, the eccentricity restriction member 53 and the lens 63 were sequentially inserted into the tubular container hole 31a of the tubular body 31 in the same approach as the sequential inserting steps of the eccentricity restriction member 51 and the lens 61. This resulted in the eccentricity restriction member 53 being fitted in the tubular container hole 31a of the tubular body 31 while being close to or abutted on the lens 62, and the lens 63 is fitted in the eccentricity restriction member 53.

After the sequential inserting steps of the eccentricity restriction member 53 and the lens 63, the eccentricity restriction member 54 and the lens 64 were sequentially inserted into the tubular container hole 31a of the tubular body 31 in the same approach as the sequential inserting steps of the eccentricity restriction member 51 and the lens 61. This resulted in the eccentricity restriction member 54 is fitted in the tubular container hole 31a of the tubular body 31 while being close or abutted on the lens 63, and the lens 64 being fitted in the eccentricity restriction member 54. After the sequential inserting steps of the eccentricity restriction member 54 and the lens 64, the eccentricity restriction member 55 and the lens 65 were sequentially inserted into the tubular container hole 31a of the tubular body 31 in the same approach as the sequential inserting steps of the eccentricity restriction member 51 and the lens 61. This resulted in the eccentricity restriction member 55 is fitted in the tubular container hole 31a of the tubular body 31 while being close or abutted on the lens 64, and the lens 65 is fitted in the eccentricity restriction member 55.

Thereafter, while the threads 36 of the secure ring 22 were partly engaged with the threads 35 of the annular inner peripheral edge 33a2, the secure ring 22 was screwed into the annular inner peripheral edge 33a2, resulting in the secure ring 22 being moved in the front direction. When the secure ring 22 was in contact with the periphery of the outer major surface 65a of the lens 65, the securing ring 22 was fixedly fitted in the annular inner peripheral edge 33a2 while pressing, i.e. urging, the lens 65 toward the front direction of the vehicle. This resulted in the eccentricity reduction members 51 to 55, the lenses 61 to 65, and the spacer ring 71 being installed in the tubular body 11 while being biased toward the front direction of the vehicle.

Each of the lens modules 3A and 4A configured above includes the lenses 61 to 65, the tubular body 31, and the eccentricity reduction members 51 to 55.

The tubular body 31 has a predetermined length in its axial direction. The tubular body 31 has the front opening 31b communicating with the interior of the tubular body 31; the front opening 31b is configured to enable light to be incident into the tubular body 31 therethrough. The tubular body 31 also has the rear opening 31c communicating with the interior of the tubular body 31.

Each of the eccentricity restriction members 51 to 55 is comprised of an elastic tubular member coaxially disposed in the tubular body 31 while (1) The corresponding outer periphery is in contact with the inner periphery of the tubular body 31

(2) The corresponding one of the lenses 61 to 65 is filled in the corresponding eccentricity restriction member such that the corresponding inner periphery surrounds the outer periphery of the corresponding one of the lenses 61 to 65 while inwardly biasing the outer periphery of the corresponding one of the lenses 61 to 65

(3) The lenses 61 to 65 are disposed in the tubular body 31 such that the lenses 61 to 65 have the common optical axis AX Each of the eccentricity restriction members 52 to 55 also includes the corresponding one of the ring holders 52a to 55a that projects inwardly from the inner edge of the front end thereof toward the optical axis AX of the lenses 61 to 65.

That is, each of the lens modules 3A and 4A is configured such that each of the eccentricity restriction members 51 to 55 is disposed between the inner periphery of the tubular body 31 and the corresponding one of the lenses 61 to 65 to surround the outer periphery of the corresponding one of the lenses 61 to 65 while inwardly biasing the outer periphery of the corresponding one of the lenses 61 to 65.

This configuration prevents each of the lenses 61 to 65 from being thermally expanded.

This configuration also enables, even if at least one of the lenses 61 to 65 is thermally expanded, the corresponding at least one of the eccentricity restriction members 51 to 55 to elastically press the outer periphery of at least one of the lenses 61 to 65 inwardly, making it possible to restrict movement of the at least one of the lenses 61 to 65 in a radial direction perpendicular to the optical axis AX.

Similarly, this configuration enables, even if the tubular body 31 is thermally expanded, the eccentricity restriction members 51 to 55 to elastically press the outer peripheries of the respective lenses 61 to 65 inwardly, making it possible to restrict movement of the at least one of the lenses 61 to 65 in a radial direction perpendicular to the optical axis AX.

Each of the lens modules 3A and 4A is configured such that each of the ring holders 52a to 55a, which projects from the front end of the corresponding one of the eccentricity reduction members 52 to 55, is closely attached to the corresponding one of the lenses 62 to 65. This results in the friction between each of the ring holders 52a to 55a and the corresponding one of the lenses 62 to 65 restricting radial movement of the lenses 62 to 65, which is perpendicular to the optical axis AX.

Each of the lens modules 3A and 4A is configured such that a first lens assembly of the eccentricity restriction member 51 and the lens 61, the spacer ring 71, a second lens assembly of the eccentricity restriction member 52 and the lens 62, a third lens assembly of the eccentricity restriction member 53 and the lens 63, a fourth lens assembly of the eccentricity restriction member 54 and the lens 64, and a fifth lens assembly of the eccentricity restriction member 55 and the lens 65 are coaxially arranged, i.e. stacked, in the tubular body 31 from the front end to the rear end of the tubular body 31.

Additionally, each of the lens modules 3A and 4A includes the securing ring 22 that presses the lens 65, i.e. the stack of the first lens assembly, the spacer ring 71, the second lens assembly, the third lens assembly, the fourth lens assembly, and the fifth lens assembly, toward the front direction of the vehicle. This fastens the stack of the first lens assembly, the spacer ring 71, the second lens assembly, the third lens assembly, the fourth lens assembly, and the fifth lens assembly to the inner periphery of the tubular body 31. This results in an increase of the friction between each of the ring holders 52a to 55a and the corresponding one of the lenses 62 to 65, thus further restricting radial movement of the lenses 62 to 65, which is perpendicular to the optical axis AX.

The present disclosure is not limited to the first and second embodiments set forth above, and can be variously modified.

The linear expansion coefficient of the tubular body 31 of the lens barrel 11 is set to be identical to the linear expansion coefficient of the housing 2, but can be set to be substantially identical to the linear expansion coefficient of the housing 2. That is, even if a modification is configured such that the linear expansion coefficient of the tubular body 31 of the lens barrel 11 is slightly different from the linear expansion coefficient of the housing 2, the linear expansion coefficient of the tubular body 31 of the lens barrel 11 can be regarded to be substantially identical to the linear expansion coefficient of the housing 2 as long as this modification can achieve the same benefits achieved by each of the first and second embodiments.

The functions of one element in each of the embodiments can be distributed as plural elements, and the functions that plural elements have can be combined into one element. At least part of the structure of each of the embodiments can be replaced with a known structure having the same function as the at least part of the structure of the corresponding embodiment. A part of the structure of each of the embodiments can be eliminated. At least part of the structure of each of the embodiments can be added to or replaced with at least part of the structure of the other one of the embodiments.

All aspects included in the technological ideas specified by the language employed by the claims constitute embodiments of the present disclosure.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A lens module comprising:
   a tubular body having opposing first and second ends in an axial direction thereof, and an inner periphery,
   the tubular body comprising first and second openings at the respective first and second ends, each of the first and second openings communicating with an interior of the tubular body, the first opening being configured to enable light to be incident into the tubular body therethrough;
   a plurality of lenses disposed in the tubular body such that the lenses have a common optical axis; and
   an eccentricity restriction member, separate from the plurality of lenses, made of an elastic tubular member and having:
      opposing first and second ends in an axial direction thereof, and
      an inner periphery and an outer periphery,
   the first end of the eccentricity restriction member being closer to the first end of the tubular body than the second end of the eccentricity restriction member is, the eccentricity restriction member being coaxially disposed in the tubular body such that:
      the outer periphery of the eccentricity restriction member is in contact with the inner periphery of the tubular body; and
      the inner periphery of the eccentricity restriction member surrounds an outer periphery of at least one of the lenses while biasing the outer periphery of the at least one of the lenses toward the common axis,
   the eccentricity restriction member comprising a holder formed at the first end thereof, the holder being attached to one of the lenses that is closest to the first end of the eccentricity restriction member, wherein
   a diameter of the outer periphery of the eccentricity restriction member is larger than a diameter of the inner periphery of the tubular body in an unassembled state in which the eccentricity restriction member is not inserted into the tubular body such that the tubular body compresses the eccentricity restriction member in an assembled state in which the eccentricity restriction member is inserted into the tubular body, which biases the outer periphery of the at least one of the lenses toward the common axis.

2. The lens module according to claim 1, wherein:
   the eccentricity restriction member is configured such that the first end of the eccentricity restriction member is located to be adjacent to the first end of the tubular body, and the second end of the eccentricity restriction member is located to be adjacent to the second end of the tubular body.

3. The lens module according to claim 2, wherein the eccentricity restriction member has a predetermined modulus of elasticity, the lens module further comprising:

a plurality of spacer rings each made of a material having a predetermined modulus of elasticity that is higher than the modulus of elasticity of the eccentricity restriction member, each of the spacer rings being disposed in the eccentricity restriction member while being interposed between a corresponding adjacent pair of the lenses.

4. The lens module according to claim 3, further comprising:
a securing member attached to the second end of the tubular body and configured to press one of the lenses toward the first end of the tubular body that is closest to the second end of the tubular body to thereby secure the lenses and the ring spacers to the tubular body.

5. The lens module according to claim 1, wherein:
the inner periphery of the eccentricity restriction member surrounds the outer periphery of the at least one of the lenses while biasing the outer periphery of the at least one of the lenses in a direction substantially perpendicular to the common optical axis.

6. The lens module according to claim 1, wherein:
an elasticity of the eccentricity restriction member allows the diameter of the outer periphery of the eccentricity restriction member to be larger than the diameter of the inner periphery of the tubular body when the eccentricity restriction member is separated from the tubular body in the unassembled state such that the outer periphery of the at least one of the lenses is biased toward the common axis upon assembly of the lens module in the assembled state.

7. The lens module according to claim 1, wherein:
the eccentricity restriction member prevents direct contact between each of the plurality of the lenses and the inner periphery of the tubular body when the eccentricity restriction member is inserted into the tubular body in the assembled state.

8. A stereo camera comprising:
a housing having an inner hollow container space and a predetermined linear expansion coefficient; and
a first lens module at least partly housed in the housing; and
a second lens module at least partly housed in the housing, each of the first and second lens modules comprising:
a tubular body having opposing first and second ends in an axial direction thereof, an inner periphery, and a predetermined linear expansion coefficient that is identical to the linear expansion coefficient of the housing,
the tubular body comprising first and second openings at the respective first and second ends, each of the first and second openings communicating with an interior of the tubular body, the first opening being configured to enable light to be incident into the tubular body therethrough;
a plurality of lenses disposed in the tubular body such that the lenses have a common optical axis; and
an eccentricity restriction member, separate from the plurality of lenses, made of an elastic tubular member and having opposing first and second ends in an axial direction thereof, and an inner periphery and an outer periphery,
the first end of the eccentricity restriction member being closer to the first end of the tubular body than the second end of the eccentricity restriction member is, the eccentricity restriction member being coaxially disposed in the tubular body such that:
the outer periphery of the eccentricity restriction member is in contact with the inner periphery of the tubular body; and
the inner periphery of the eccentricity restriction member surrounds an outer periphery of at least one of the lenses while biasing the outer periphery of the at least one of the lenses toward the common axis,
the eccentricity restriction member comprising a holder formed at the first end thereof, the holder being attached to one of the lenses that is closest to the first end of the eccentricity restriction member, wherein
a diameter of the outer periphery of the eccentricity restriction member is larger than a diameter of the inner periphery of the tubular body in an unassembled state in which the eccentricity restriction member is not inserted into the tubular body such that the tubular body compresses the eccentricity restriction member in an assembled state in which the eccentricity restriction member is inserted into the tubular body, which biases the outer periphery of the at least one of the lenses toward the common axis.

9. The stereo camera according to claim 8, wherein:
the eccentricity restriction member is configured such that the first end of the eccentricity restriction member is located to be adjacent to the first end of the tubular body, and the second end of the eccentricity restriction member is located to be adjacent to the second end of the tubular body.

10. The stereo camera according to claim 9, wherein the eccentricity restriction member has a predetermined modulus of elasticity, the lens module further comprising:
a plurality of spacer rings each made of a material having a predetermined modulus of elasticity that is higher than the modulus of elasticity of the eccentricity restriction member, each of the spacer rings being disposed in the eccentricity restriction member while being interposed between a corresponding adjacent pair of the lenses.

11. The lens module according to claim 10, further comprising:
a securing member attached to the second end of the tubular body and configured to press one of the lenses toward the first end of the tubular body that is closest to the second end of the tubular body to thereby secure the lenses and the ring spacers to the tubular body.

12. The stereo camera according to claim 8, wherein:
the inner periphery of the eccentricity restriction member surrounds the outer periphery of the at least one of the lenses while biasing the outer periphery of the at least one of the lenses in a direction substantially perpendicular to the common optical axis.

13. The stereo camera according to claim 8, wherein:
an elasticity of the eccentricity restriction member allows the diameter of the outer periphery of the eccentricity restriction member to be larger than the diameter of the inner periphery of the tubular body when the eccentricity restriction member is separated from the tubular body of each of the first and second lens modules in the unassembled state such that the outer periphery of the at least one of the lenses is biased toward the common axis upon assembly of each of first and second lens module in the assembled state.

14. A lens module comprising:
a tubular body having opposing first and second ends in an axial direction thereof, and an inner periphery, the tubular body comprising first and second openings at the respective first and second ends, each of the first and second openings communicating with an interior of the tubular body, the first opening being configured to enable light to be incident into the tubular body therethrough;

a plurality of lenses disposed in the tubular body such that the lenses have a common optical axis;

a plurality of eccentricity restriction members, separate from each of the plurality of lenses, each of the plurality of eccentricity restriction members made of an elastic tubular member and having opposing first and second ends in an axial direction thereof, and an inner periphery and an outer periphery, each of the eccentricity restriction members being coaxially arranged in the tubular body such that:
- the outer periphery of the eccentricity restriction member is in contact with the inner periphery of the tubular body; and
- the inner periphery of the eccentricity restriction member surrounds an outer periphery of a corresponding one of the lenses while biasing the outer periphery of the corresponding one of the lenses toward the common axis, each of the eccentricity restriction members comprising a holder formed at the first end thereof, the holder of each of the eccentricity restriction members being attached to a corresponding one of the lenses; and a securing member attached to the second end of the tubular body and configured to press one of the lenses toward the first end of the tubular body to thereby secure the lenses and the eccentricity restriction members to the tubular body, one of the lenses pressed by the securing member being closest to the second end of the tubular body, wherein a diameter of the outer periphery of each of the eccentricity restriction members is larger than a diameter of the inner periphery of the tubular body in an unassembled state in which each of the eccentricity restriction members is not inserted into the tubular body such that the tubular body compresses each of the eccentricity restriction members in an assembled state in which each of the eccentricity restriction members is inserted into the tubular body, which biases the outer periphery of the corresponding one of the lenses toward the common axis.

15. The lens module according to claim 14, wherein:
the inner periphery of the eccentricity restriction member surrounds the outer periphery of the at least one of the lenses while biasing the outer periphery of the at least one of the lenses in a direction substantially perpendicular to the common optical axis.

16. The lens module according to claim 14, wherein:
an elasticity of the plurality of eccentricity restriction members allows the diameter of the outer periphery of at least one of the plurality of eccentricity restriction members to be larger than the diameter of the inner periphery of the tubular body when at least one of the plurality of eccentricity restriction members is separated from the tubular body in the unassembled state such that the outer periphery of the corresponding one of the lenses is biased toward the common axis upon assembly of the lens module in the assembled state.

* * * * *